(12) United States Patent
Ishibashi et al.

(10) Patent No.: US 7,206,951 B2
(45) Date of Patent: Apr. 17, 2007

(54) INFORMATION-PROCESSING APPARATUS AND METHOD OF CONTROLLING POWER SAVING

(75) Inventors: Yasuhiro Ishibashi, Ome (JP); Hideyuki Toma, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 531 days.

(21) Appl. No.: 10/704,640

(22) Filed: Nov. 12, 2003

(65) Prior Publication Data

US 2004/0158748 A1 Aug. 12, 2004

(30) Foreign Application Priority Data

Nov. 12, 2002 (JP) .............................. 2002-328408

(51) Int. Cl.
*G06F 4/26* (2006.01)
(52) U.S. Cl. ..................... 713/323; 713/300; 713/320; 713/321; 713/322; 713/324; 713/330; 713/340; 713/310
(58) Field of Classification Search ................ 713/300, 713/310, 320–324, 330, 340
See application file for complete search history.

(56) References Cited

U.S. PATENT DOCUMENTS

| | | | | |
|---|---|---|---|---|
| 5,812,860 | A * | 9/1998 | Horden et al. .............. | 713/322 |
| 5,878,251 | A | 3/1999 | Hagiwara et al. | |
| 6,193,422 | B1 * | 2/2001 | Belt et al. .................. | 713/320 |
| 6,667,648 | B2 * | 12/2003 | Stout et al. ................. | 327/333 |
| 6,763,473 | B1 * | 7/2004 | Oteki et al. ................. | 713/324 |
| 6,782,482 | B2 * | 8/2004 | Nishizawa .................. | 713/320 |
| 6,804,591 | B1 * | 10/2004 | Miyazawa .................... | 701/36 |
| 6,820,240 | B2 * | 11/2004 | Bednar et al. ................ | 716/1 |
| 6,845,456 | B1 * | 1/2005 | Menezes et al. ............ | 713/320 |
| 6,925,574 | B2 * | 8/2005 | Satoh ........................ | 713/323 |
| 2003/0009702 | A1 * | 1/2003 | Park .......................... | 713/300 |

FOREIGN PATENT DOCUMENTS

CN 1262466 A 8/2000

(Continued)

OTHER PUBLICATIONS

Notification of Reasons for Rejection, dated Feb. 8, 2005, for Japanese Patent Application No. JP 2002-328408 and English-language translation.

(Continued)

*Primary Examiner*—A. Elamin
(74) *Attorney, Agent, or Firm*—Finnegan, Henderson, Farabow, Garrett & Dunner, L.L.P.

(57) ABSTRACT

A power control driver of a BIOS has a function of changing a frequency of clock supplied to a CPU. According to the function of the power control driver, it is possible to set a normal mode for showing the CPU capability to the maximum and a power saving mode for preferentially taking power saving rather than the CPU capability. A power control utility program carries out the following power saving control. The program shifts a system to the normal mode when an AV application program operating an encoder and a decoder required for showing the CPU capability to the maximum is operating. In addition, the program shifts the system to the power saving mode when the program is not operating even if application programs other than the program are operating.

4 Claims, 4 Drawing Sheets

FOREIGN PATENT DOCUMENTS

| | | |
|---|---|---|
| JP | 5-32018 | 2/1993 |
| JP | 5-273950 | 10/1993 |
| JP | 6-149406 | 5/1994 |
| JP | 6-255213 | 9/1994 |
| JP | 7-134628 | 5/1995 |
| JP | 9-63188 | 3/1997 |
| JP | 9-247543 | 9/1997 |
| JP | 2002-207528 | 7/2002 |
| TW | 495064 | 7/2002 |

OTHER PUBLICATIONS

Notification of the First Office Action, dated Mar. 4, 2005, for Chinese Patent Application No. 200310114301.9 and English-language translation.

Office Action, dated Mar. 20, 2006, for Taiwanese Patent Application No. 92130955 and English-language translation.

\* cited by examiner

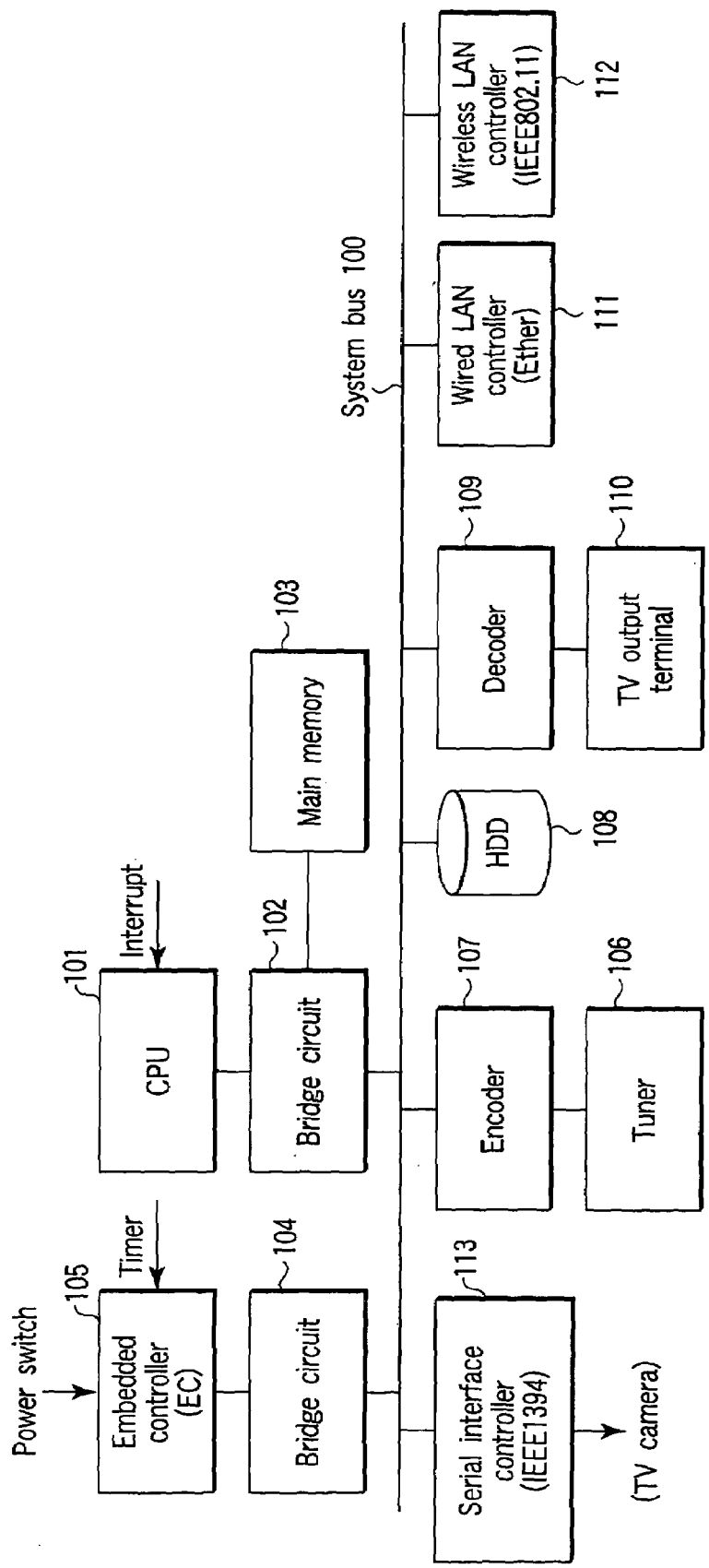
F I G. 2

INFORMATION-PROCESSING APPARATUS AND METHOD OF CONTROLLING POWER SAVING

CROSS-REFERENCE TO RELATED APPLICATIONS

This application is based upon and claims the benefit of priority from the prior Japanese Patent Application No. 2002-328408, filed Nov. 12, 2002, the entire contents of which are incorporated herein by reference.

BACKGROUND OF THE INVENTION

1. Field of the Invention

The present invention relates to a power saving technique of an information-processing apparatus always connected to the Internet.

2. Description of the Related Art

In recent years, battery-powered information-processing apparatuses such as notebook-sized personal computers and personal digital assistants (PDAs) have been variously developed. In this kind of information-processing apparatuses, various methods of controlling power saving are proposed to make long the lifetime of battery (e.g., Japanese Patent Application KOKAI Publication No. 6-149406).

Likewise, various methods of controlling power saving are proposed in desktop personal computers, that is, desktop information-processing apparatuses driven by an external power source (AC utility source) (e.g., Japanese Patent Application KOKAI Publication No. 7-134628). In this case, constant connection to the Internet is taken into consideration.

Recently, the development of an information-processing apparatus called a home server has been advanced. The home server includes a tuner for receiving terrestrial broadcasting and satellite broadcasting, a router for making connection with the Internet. In addition, the home server has a function of making wireless communication with many electronic apparatuses in the home. One home server is located in the home, and thereby, the following matters are possible. For example, members of the family can set a video cassette recorder to record a program in advance while they are in an individual private room. Members of the family can appreciate the recorded television broadcasting on the display of their own terminal. Members of the family can browse Web pages published on Internet using the display of their own terminal. The power saving control described above is applied to the home server, and thereby, wasted power consumption can be prevented.

In general, the home server requires maximum CPU power when carrying out so-called image processing. According to image processing, an encoder compresses and encodes video data of the television broadcasting received by the tuner, or a decoder decodes the compressed and encoded video data. On the other hand, when the router is operating, the CPU power is not required so much. Therefore, it is preferable to carry out finer power saving control considering the required CPU power.

However, according to the power saving control method, it is determined whether any device is operating or not, and the changeover of the CPU power is merely made between two ways, that is, on and off. For this reason, it is the actual state that wasted power consumption still occurs.

BRIEF SUMMARY OF THE INVENTION

According to an embodiment of the present invention, an information-processing apparatus having a first operation mode and a second operation mode having power consumption smaller than the first operation mode, comprises an image processing unit configured to carry out image processing; a determination unit configured to determine whether or not the image processing unit is operating; and a control unit configured to control changeover between the first and second operation modes based on a determination result by the determination unit so that a system is shifted to the first operation mode if the image processing unit is operating while being shifted to the second operation mode if it is not operating.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 2 is a block diagram showing the configuration of the home server of the embodiment;

DETAILED DESCRIPTION OF THE INVENTION

Embodiment of the present invention will be described below with reference to the accompanying drawings.

Figure 1:
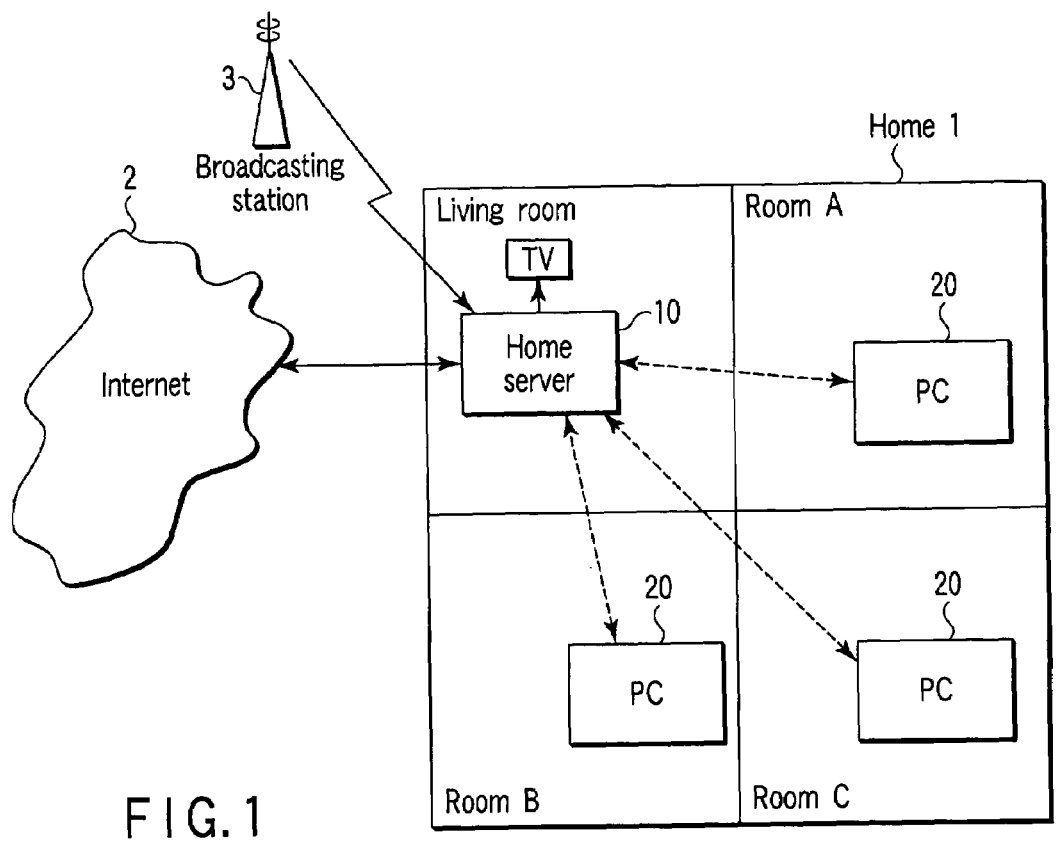
FIG. 1 is a view to explain a state when a home server according to one embodiment of the present invention is applied.

FIG. 1 is a view to explain a state when a home server according to one embodiment of the present invention is applied.

As shown in FIG. 1, a home server 10 of the embodiment is located on the living room of each home 1. The home server 10 makes communications with content providers via the Internet 2 while receiving TV programs broadcast from a broadcasting station 3. In addition, the home server 10 is connected with several personal computers (PCs) 20 indoors via a wireless local area network (LAN). The home server 10 makes communication with the content providers and receives TV programs in accordance with instructions from the personal computers 20. Further, the home server 10 transmits content data and TV program data thus obtained to the personal computers 20. Namely, the home server 10 is a constant operating type information-processing apparatus, which must make communication with the Internet 2 and wireless LAN started at an arbitrary timing. For this reason, the home server 10 is an apparatus requiring proper power saving control. Incidentally, the home server 10 is available in a local environment of recording TV programs and displaying the recorded TV programs on a monitor (TV) in accordance with the operation of buttons provided on the housing.

The personal computer 20 is a notebook-sized or desktop computer owned by individual persons, which is used in their private room. In addition, the personal computer 20 has a function of making communications with the home server 10 via wireless LAN. The communication via wireless LAN between the home server 10 and the personal computers 20 is made conformable to standards such as IEEE 801.11.

FIG. 2 is a block diagram showing the configuration of the home server 10 of the embodiment. As seen from FIG. 2, the home server 10 is provided with a system bus 100. The system bus 100 is used as a bearer transmission line, and connected with the following devices. The devices are CPU 101, bridge circuit 102, main memory 103, bridge circuit 104, embedded controller (EC) 105, tuner 106, encoder 107, HDD (Hard Disk Drive) 108, decoder 109, TV output terminal 110, wired LAN controller 111, wireless LAN controller 112 and serial interface controller 113.

The CPU 101 controls the entirety of the home server 10, and executes programs stored in the main memory 103, and thereby, driving each device included in the home server 10. In this case, the CPU 101 is operated when receiving a clock supplied from an oscillator circuit (not shown). The home server 10 varies a clock frequency supplied to the CPU 101, and thereby, realizes three operation modes, that is, a normal mode, a power saving mode and a sleep mode.

The normal mode is a mode for showing the maximum capability of the CPU 101. The clock frequency supplied to the CPU 101 is the highest; as a result, power consumption per unit time reaches the maximum amount. Conversely, the power saving mode is a mode, which preferentially takes power saving rather than the capability of the CPU 101. Thus, the frequency supplied to the CPU 101 is reduced more than the normal mode (e.g., ⅓). As a result, the power consumption per unit time is reduced. The sleep mode is a mode for performing power saving more than the power saving mode; thus, the supply of clock to the CPU 101 is stopped. Namely, in the sleep mode, the operation of the CPU 101 is stopped, and thereby, the entire power consumption of the home server 10 is made smaller. The home server 10 has features of properly changing and controlling three operation modes described above, and thereby, realizing further power saving. The features will be described later.

The bridge circuit 102 is used for connecting the CPU 101 to the system bus 100, and also, controls access to the main memory 103. The main memory 103 is a memory device, which is used as the main storage of the home server 10. The main memory 103 stores various programs executed by the CPU 101 and various data inputted and outputted by the programs.

On the other hand, the bridge circuit 104 is used for connecting the embedded controller 105 to the system bus 100. The embedded controller 105 controls the power supply to each devices included in the home server 10. More specifically, the embedded controller 105 starts the power supply to each device when the power switch is turned on and when receiving an on signal from a timer. Thereafter, the embedded controller 105 outputs an interrupt signal for starting up the system to the CPU 101. Conversely, the embedded controller 105 stops the power supply to each device when receiving a shutdown instruction from the CPU 101 via the system bus 100.

The tuner 106 receives a TV program of the broadcasting station 3 selected by the encoder 107, and returns the TV program data to the encoder 107. On the other hand, the encoder 107 compresses and encodes the TV program data received from the tuner 106, and thereafter, stores it in the main memory 103. In this case, the main memory 103 functions as a buffer for temporarily storing the compressed and encoded TV program data. The compressed and encoded TV program data is transferred to the HDD 108 after being temporarily stored in the main memory 103, and permanently stored therein.

The HDD 108 is a memory device, which is used as an external storage of the home server 10. The HDD 108 stores a large amount of various programs and data as the auxiliary device of the main memory 103. The decoder 109 decodes the compressed and encoded TV program data stored in the HDD 108. The TV output terminal 110 is used for outputting the decoded TV program data to a monitor. The compressed and encoded TV program data stored in the HDD 108 is sent to the personal computer 20 via the wireless LAN controller described later. Thereafter, the personal computer 20 decodes the sent TV program data to display it on the monitor.

The wired LAN controller 111, wireless LAN controller 112 and serial interface controller 113 are devices for controlling communications with external apparatuses. The wired LAN controller 111 controls communications with the Internet 2. The wireless LAN controller 112 controls communications with the personal computer 20. The serial interface controller 113 controls communications with peripheral devices such as television camera. Namely, the wired LAN controller 111 and the wireless LAN controller 112 are operated as a router for browsing Web pages published on the Internet 2 in each personal computer 20. The controllers 111, 112 and 113 output an interrupt signal for starting upper application programs to the CPU 101 when starting communications according to a request from partner side.

Figure 3:
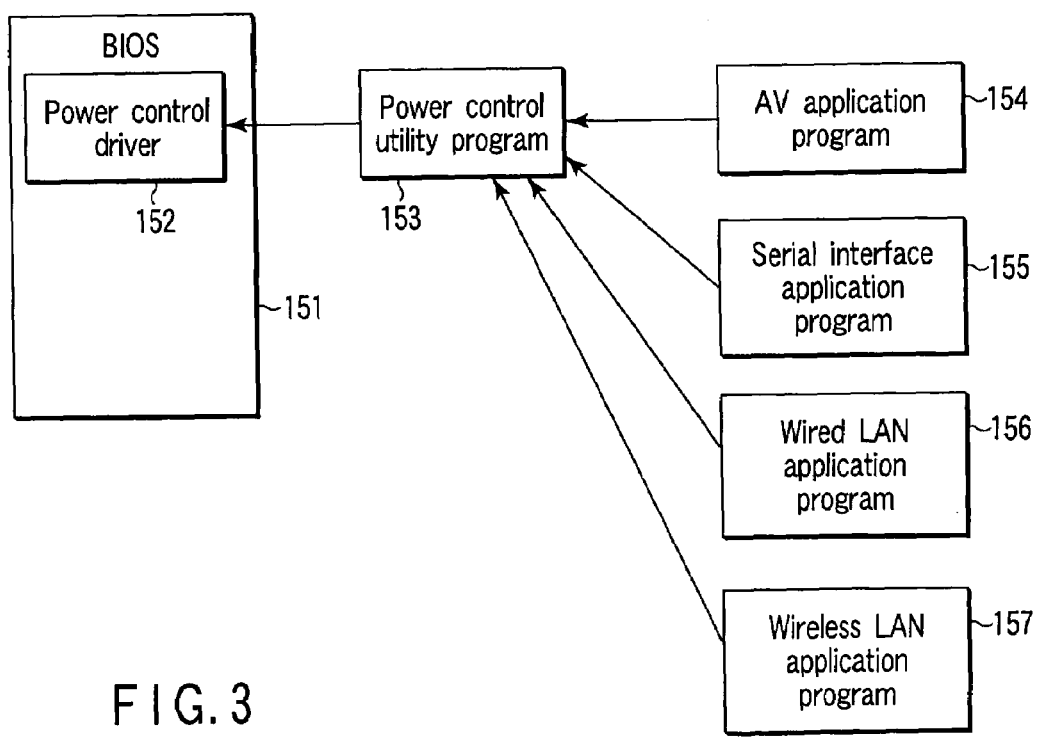
FIG. 3 is a functional block diagram to explain power saving control of the home server of the embodiment.

FIG. 3 is a functional block diagram to explain power saving control of the home server 10.

In FIG. 3, there are shown a basic input/output system (BIOS) 151, power control utility program 153, AV application program 154, serial interface application program 155, wired LAN application program 156 and wireless LAN application program 157. The CPU 101 executes all these programs. The BIOS 151 has a power control driver 152. The above-mentioned programs 153 to 157 excepting the BIOS 151 are operated and controlled according to an operating system (not shown).

The BIOS 151 is a program for driving and controlling each device included in the home server 10. The upper application program makes use of the function provided by the BIOS 151 so that hardware, that is, each device executes a desired operation. The power control driver 152 is one of the functions included in the BIOS 151, and carries out a changeover among three operation modes described before.

The power control utility program 153 controls the changeover among three operation modes using the power control driver 152 of the BIOS 151 based on the operating state of the upper application program. More specifically, the program 153 shifts the system to the normal mode for showing the maximum capability of the CPU 101 when the AV application program 154 carrying out image processing is operating. According to image processing, the encoder 107 compresses and encodes TV program data while the decoder 109 decodes the TV program data. In addition, the program 153 shifts the system to the power saving mode for preferentially taking power saving rather than the capability of the CPU 101 under the following condition. The shift to the power saving mode is made when any of the programs 155 to 157 is operating although the AV application program 154 is not operating. If all of programs are not operating, the power control utility program 153 shifts the system to the sleep mode for stopping the supply of clock to the CPU 101.

Conversely, if any program starts the operation in a state of being shifted to the sleep mode, the program 153 does not uniformly shift the system to the normal mode as the conventional case, but carries out the following mode shift. Namely, if the operating program is the AV application program 154, the power control utility program 153 shifts the system to the normal mode. If the operating program is a program other than above, the power control utility program 153 shifts the system to the power saving mode.

Incidentally, the serial interface application program 155 is a program for making communication via the serial interface controller 113. The wired LAN application program 156 is a program for making communication via the wired LAN controller 111. The wireless LAN application program 157 is a program for making communication via the wireless LAN controller 112.

In general, the maximum capability of the CPU 101 is required to operate the encoder 107 and the decoder 109. Conversely, the capability of the CPU 101 is not so required to operate the wired LAN controller 111, the wireless LAN controller 112 and the serial interface controller 113. Therefore, no reduction occurs in the performance of the entire system even if the capability of the CPU 101 is reduced when the encoder 107 and the decoder 109 are operating. Namely, in the home server 10, operation mode changeover control considering the point described above is carried out. By doing so, the reduction of power consumption of the entire system is realized.

The power control utility program 153 carrying out the operation mode changeover control determines whether or not application programs are operating based on information from them. For example, the case when the wireless LAN application program 155 is operating is described below. When receiving a message requesting the start of communication from the personal computer 20, the wireless LAN controller 112 supplies an interrupt signal for starting the program 155 to the CPU 101. The CPU 101 receiving the interrupt signal starts the wireless LAN application program 155. When starting up, the wireless LAN application program 155 gives startup information to the power control utility program 153. In addition, when being stopped, the program 155 gives stop information to the power control utility program 153.

The program 153 determines whether or not application programs are operating based on information sent via the foregoing procedure, and carries out the operation mode changeover control using the power control driver 152 of the BIOS 151.

Figure 4:
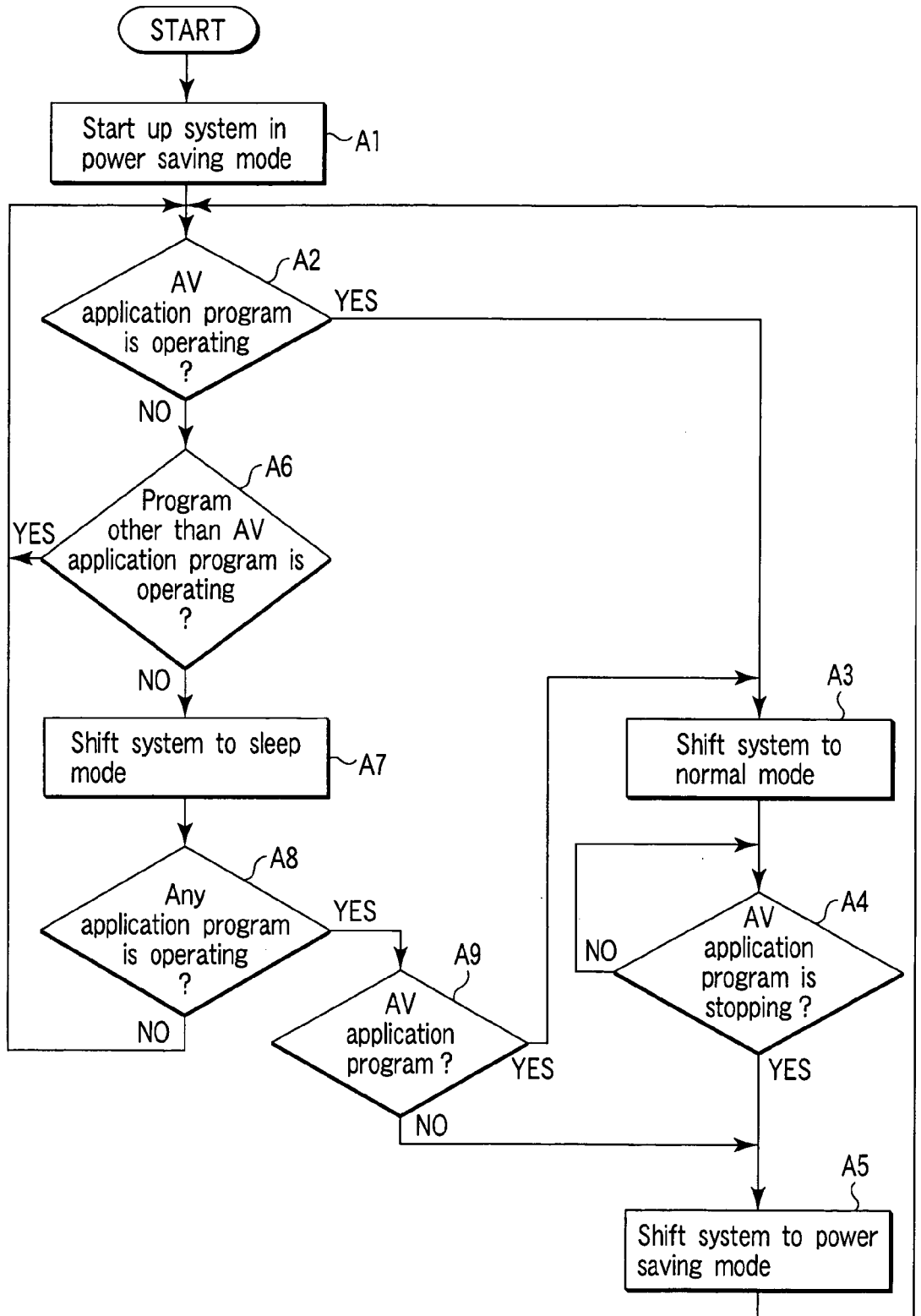
FIG. 4 is a flowchart showing the power saving control operation procedure executed by the home server of the embodiment.

FIG. 4 is a flowchart showing the power saving control operation procedure executed by the home server 10.

When power switch is turned on or when receiving on signal from the timer, the embedded controller 105 starts the power supply to each device. Thereafter, the embedded controller 105 outputs the interrupt signal for starting the system to the CPU 101. On the other hand, the CPU 101 receiving the interrupt signal executes system startup processing including the startup of the power control utility program 153. The started-up power control utility program 153 sets the system to the power saving mode (step A1).

The power control utility program 153 determines whether or not the AV application program 154 is operating (step A2). If the program 154 is operating (YES in step A2), the program 153 shifts the system to the normal mode (step A3). Thereafter, the power control utility program 153 monitors the stop of the AV application program 154 (step A4). If the program 154 is stopped (YES in step A4), the program 153 shifts the system to the power saving mode (step A5), and repeats the procedure from step A2.

On the other hand, if the AV application program 154 is not operating (NO in step A2), the program 153 determines whether or not any application programs other than the program 154 are operating (step A6). If any application programs are operating (YES in step A6), the program 153 repeats the procedure from step A2. If any application programs are not operating (NO in step A6), the power control utility program 153 shifts the system to the sleep mode (step A7).

When the system is shifted to the sleep mode, the power control utility program 153 monitors whether or not any application programs are operating (step A8). If any application programs are operating (YES in step A8), the program 153 determines whether the operating application program is the AV application program 154 (step A9). If the operating application program is the AV application program 154 (YES in step A9), the program 153 takes the procedure from step A2, that is, the procedure of shifting the system to the normal mode. On the other hand, if the operating application program is not the AV application program 154 (NO in step A9), the program 153 takes the procedure from step A5, that is, the procedure of shifting the system to the power saving mode. Thereafter, the program 153 repeats the procedure from step A2.

In the home server 10, the system is shifted to the normal mode under the following condition. The shift is made when the encoder 107 or decoder 109 requiring the maximum capability of the CPU 101 is operating, that is, when the AV application program 154 carrying out image processing is operating.

In addition, the system is shifted to the power saving mode under the following condition. The shift is made when devices other than encoder 107 or decoder 109, for example, the wireless LAN controller 112 is operating, that is, when the wireless LAN application program 157 is operating. Power saving control described above is carried out, and thereby, further power saving is achieved. In particular, if any application program is operating during the sleep mode, it is determined whether or not the operating application program is the AV application program 154. If the operating application program is the AV application program 154, the system is shifted to the normal mode. If the operating application program is a program other than the program 154, the system is shifted to the power saving mode. Control described above is carried out, and thereby, wasted power consumption is securely reduced.

Figure 5:
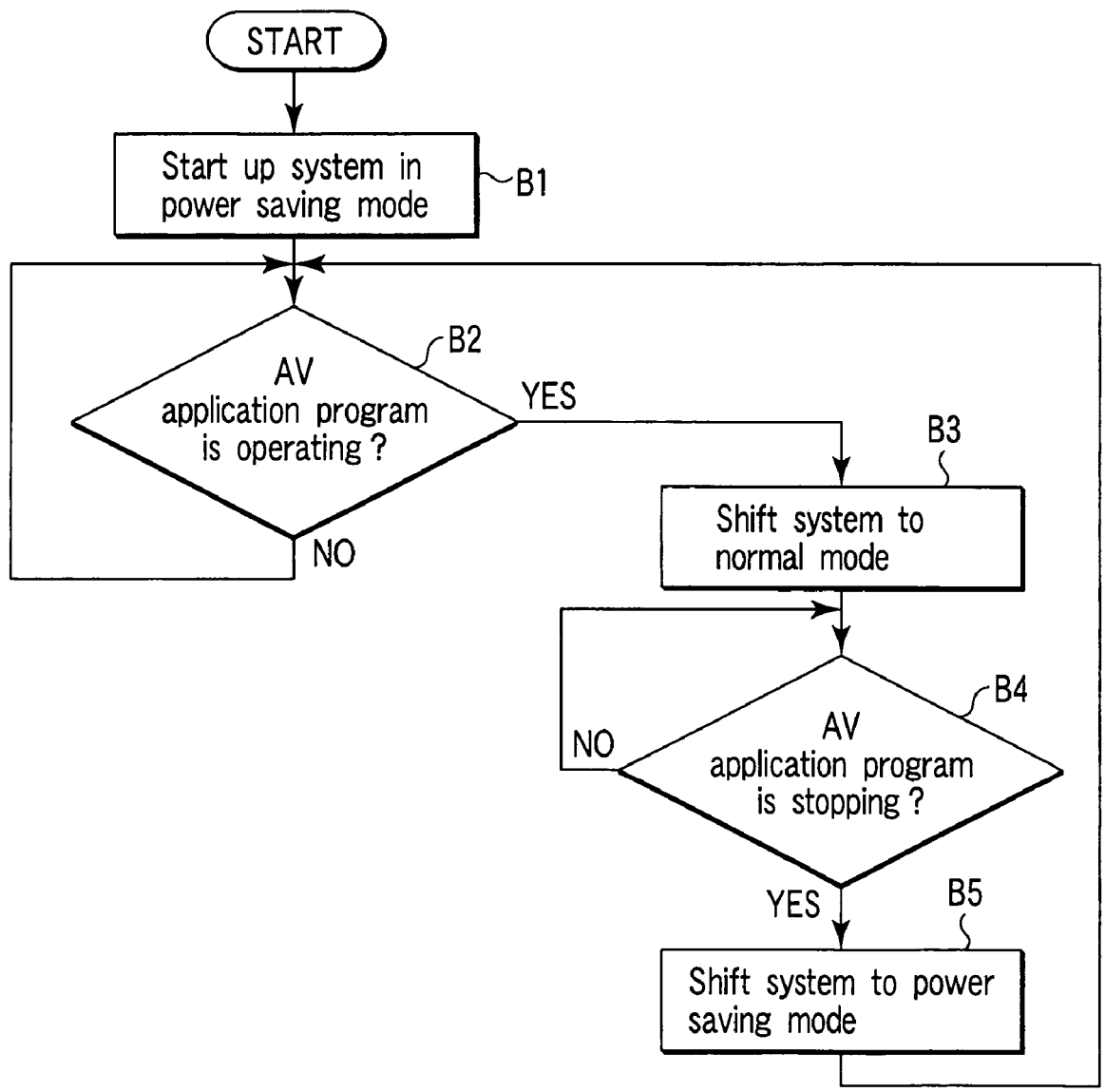
FIG. 5 is a flowchart showing the power saving control operation procedure (modification example) executed by the home server of the embodiment.

The above is the explanation on the premise that the home server 10 includes three operation modes, that is, normal mode, power saving mode and sleep mode. The present invention is not limited to the embodiment. For example, even if the home server 10 includes only two modes, that is, normal mode and power saving mode, the method of controlling power saving is effective. FIG. 5 is a flowchart showing the power saving control operation procedure executed by the home server 10 in the case described above.

The power control utility program 153 sets the system to the power saving mode in starting (step B1). The program 153 determines whether or not the AV application program 154 is operating (step B2). If the program 154 is operating (YES in step B2), the program 153 shifts the system to the normal mode (step B3). Thereafter, the power control utility program 153 monitors the stop of the AV application program 154 (step B4). If the program 154 is stopped (YES in step B4), the program 153 shifts the system to the power saving mode (step B5), and repeats the procedure from step B2.

On the other hand, if the AV application program 154 is not operating (NO in step B2), the power control utility program 153 repeats the procedure from step B2.

As well as the preceding case, the system is shifted to the normal mode when the encoder 107 or decoder 109 requiring the maximum capability of the CPU 101 is operating, that is, when the AV application program 154 carrying out image processing is operating. Control described above is carried out, and thereby, proper power saving is realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information-processing apparatus having a first operation mode, a second operation mode having power consumption smaller than the first operation mode, and a third operation mode having power consumption smaller than the second operation mode, comprising:
    an image processing unit configured to carry out image processing;
    a determination unit configured to determine whether or not the image processing unit is operating; and
    a control unit configured to control changeover between the first to third operation modes based on a determination result by the determination unit so that a system is shifted to the first operation mode if the image processing unit is operating while being shifted to the second operation mode if it is not operating, and the system is shifted to the first operation mode if the image processing unit starts the operation while being shifted to the second operation mode if other units excepting the image processing unit start the operation, during the third operation mode.

2. The apparatus according to claim 1, further comprising:
    a CPU for driving and controlling the image processing unit,
    a clock frequency supplied to the CPU being reduced when the shift to the second operation mode is made, and
    wherein when the system is shifted to the third operation mode, the clock supply to the CPU is stopped.

3. An information-processing apparatus having a first operation mode, a second operation mode having power consumption smaller than the first operation mode, and a third operation mode having power consumption smaller than the second operation mode, comprising:
    an encoder compressing and encoding video data;
    a decoder decoding the video data compressed and encoded by the encoder;
    a determination unit configured to determine whether or not the encoder and the decoder are operating; and
    a control unit configured to control changeover between the first to third operation modes based on a determination result by the determination unit so that a system is shifted to the first operation mode if at least one of the encoder and the decoder is operating while being shifted to the second operation mode if neither encoder nor decoder is operating, and the system is shifted to the first operation mode if at least one of the encoder and the decoder starts the operation while being shifted to the second operation mode if other units excepting the encoder and the decoder start the operation, during the third operation mode.

4. The apparatus according to claim 3, further comprising:
    a CPU for driving and controlling the encoder and the decoder,
    a clock frequency supplied to the CPU being reduced when the shift to the second operation mode is made, and
    wherein when the system is shifted to the third operation mode, the clock supply to the CPU is stopped.

* * * * *